United States Patent [19]

Yang

[11] Patent Number: 4,593,234
[45] Date of Patent: Jun. 3, 1986

[54] PROGRAMMABLE APPARATUS FOR CONTROLLING ILLUMINATING LAMPS

[76] Inventor: Jerry S. C. Yang, 5-1 Tay Pyng St., Shi Hwu Jenn, Jang Huah Shiann, Taiwan

[21] Appl. No.: 377,170

[22] Filed: May 11, 1982

[51] Int. Cl.[4] .............................................. H02B 1/08
[52] U.S. Cl. .................................... 315/362; 315/360; 315/307
[58] Field of Search ............................... 315/292–294, 315/307, 312, 314, 316, 323, 360, 362

[56] References Cited

U.S. PATENT DOCUMENTS

| | | | |
|---|---|---|---|
| 4,151,515 | 4/1979 | Pease et al. | 315/293 X |
| 4,172,998 | 10/1979 | Beling et al. | 315/360 X |
| 4,198,563 | 4/1980 | Elssner | 315/360 X |
| 4,209,728 | 6/1980 | Membreno | 315/360 X |
| 4,242,614 | 12/1980 | Vatis et al. | 315/294 X |
| 4,249,160 | 2/1981 | Chilvers | 315/159 |
| 4,292,570 | 9/1981 | Engel | 315/307 X |

Primary Examiner—David K. Moore
Attorney, Agent, or Firm—Cushman, Darby and Cushman

[57] ABSTRACT

An apparatus for controlling illuminating lamps. Ambient light of the surroundings is sensed, and a timer is turned on when the ambient light falls below a predetermined level. When the timer times out, the illuminating lamps are turned on provided that the ambient light is still below a predetermined level. A second timer is activated which turns the illuminating lamps off automatically a predetermined time after they are turned on regardless of the ambient light level. Before the lamps are turned off, a warning signal is issued to allow people using the illumination time to leave. The warning may be audible or may comprise flashing or dimming the illuminating lamps for a predetermined time. The intensity of each illuminating lamp can be independently varied to accommodate different lighting requirements.

19 Claims, 26 Drawing Figures

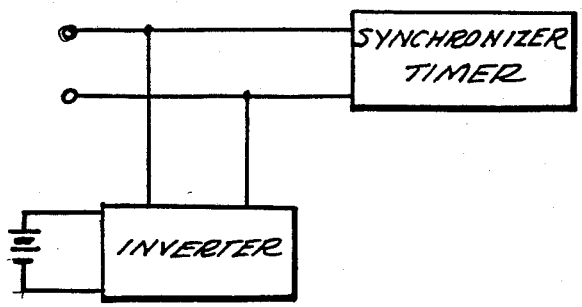
Fig.12
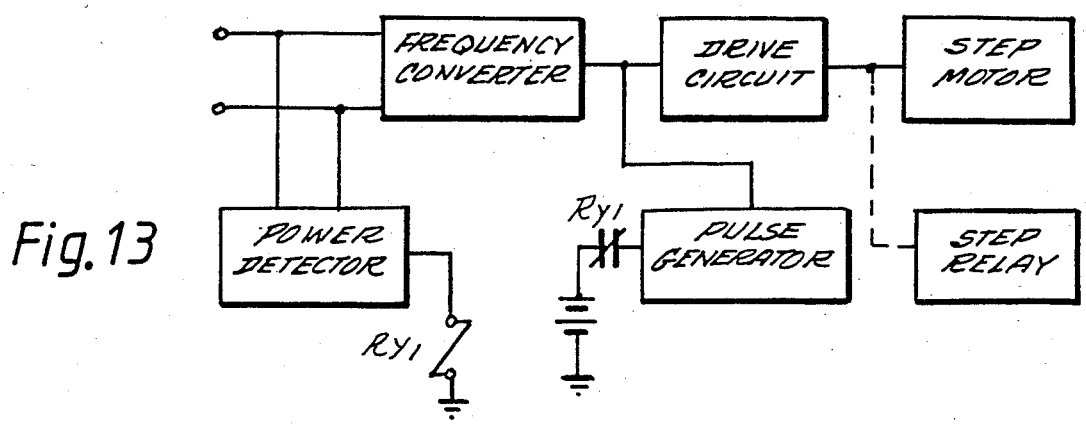
Fig.13
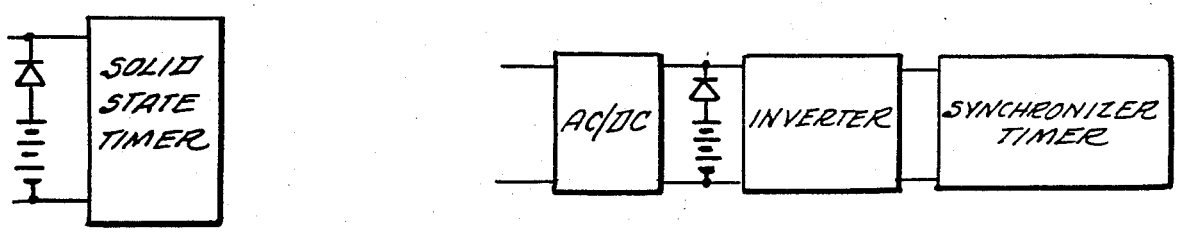
Fig.14
Fig.15
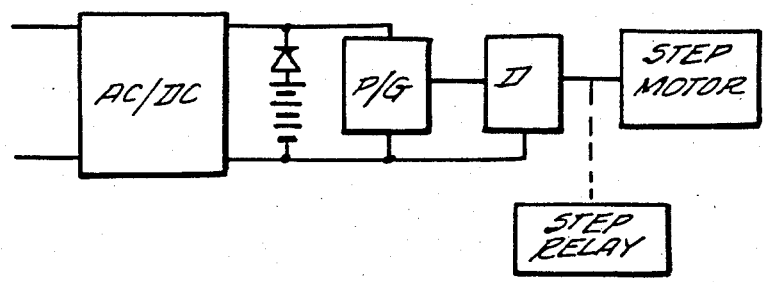
Fig.16

PROGRAMMABLE APPARATUS FOR CONTROLLING ILLUMINATING LAMPS

BACKGROUND OF THE INVENTION

Conventional automatic lighting systems are controlled by a timer. Lamps are turned on and off at predetermined times of the evening. This method of control often results in turning the lights on before they are needed, interfering with the appreciation of the beauty of twilight. In addition, the timer ceases operation during a power interruption, requiring resetting once power is restored in order to be accurate once again. The present invention has none of these disadvantages.

SUMMARY OF THE INVENTION

In accordance with the present invention, the operation of one or more illuminating lamps is controlled. The ambient light of the surroundings is sensed, and a timer turns on when the ambient light falls below a predetermined level. The lamps are turned on after this timer times out. A second timer is activated which turns the lamps off automatically a predetermined time after they are turned on. Before the lamps are turned off, a warning signal is issued to allow people using the illumination time to leave. The intensity of each lamp can be independently varied to accommodate different lighting requirements.

BRIEF DESCRIPTION OF THE DRAWINGS

FIG. 12 is a block diagram of a first embodiment of a power backup system in accordance with the present invention;

FIG. 13 is a block diagram of a second embodiment of a power backup system in accordance with the present invention;

FIG. 14 is a block diagram of a third embodiment of a power backup system in accordance with the present invention;

FIG. 15 is a block diagram of a fourth embodiment of a power backup system in accordance with the present invention;

FIG. 16 is a block diagram of a fifth embodiment of a power backup system in accordance with the present invention;

DETAILED DESCRIPTION OF PREFERRED EMBODIMENTS

Figure 1:
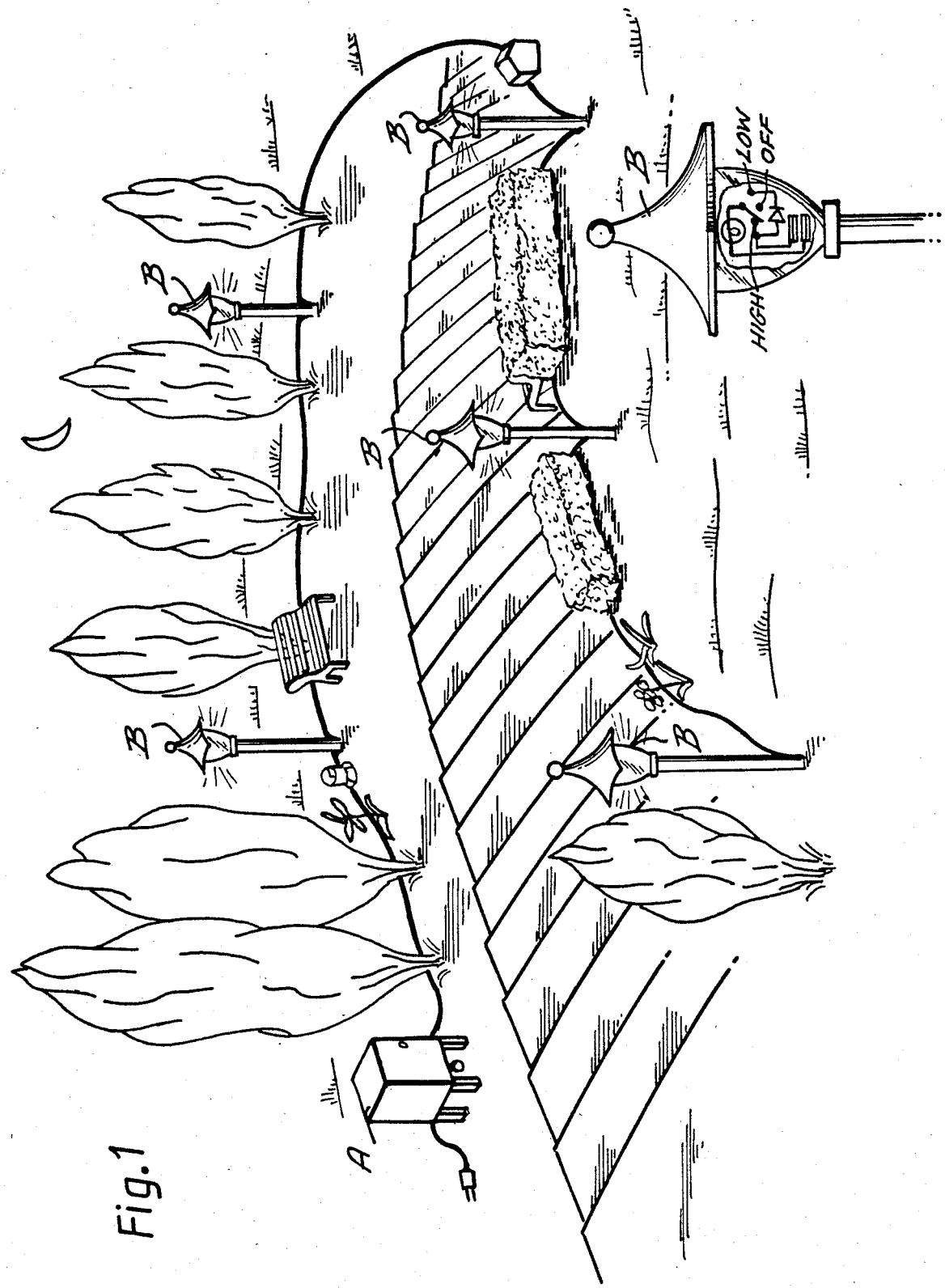
FIG. 1 is an illustration of a system employing an exemplary embodiment of the present invention.

Referring to FIG. 1, a system in accordance with the present invention comprises a control apparatus A and a plurality of illuminating lamps B.

Figure 2:
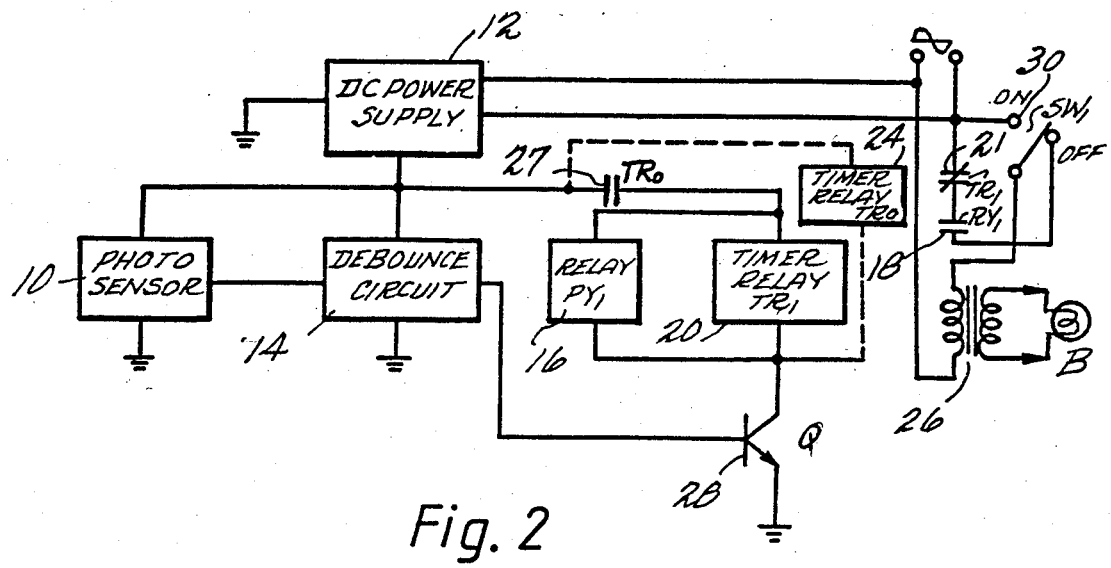
FIG. 2 is a block diagram of a first exemplary embodiment of the present invention.

Referring to FIG. 2, a first exemplary embodiment of the present invention comprises a photosensor unit 10, a DC power supply 12, a debounce circuit 14, a relay 16, a first timer relay 20, a second timer relay 24, an output transformer 26 and illumination lamps B.

Figure 3:
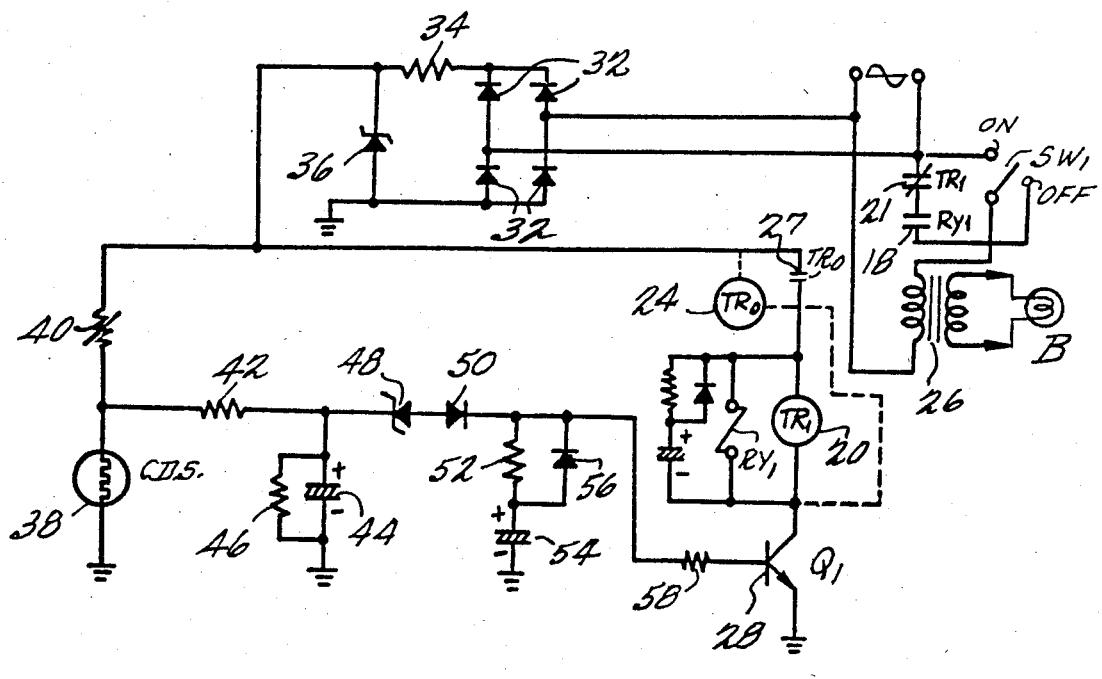
FIG. 3 is a schematic diagram of a first exemplary embodiment of the present invention.

Referring to FIGS. 2 and 3, DC power supply 12 comprises four diodes 32, a resistor 34 and a Zener diode 36. The four diodes 32 are arranged in a bridge rectifier configuration to rectify the incoming AC power source. Resistor 34 and Zener diode 36 are arranged to regulate the DC voltage output.

Photosensor 10 consists of a photosensitive cell 38, a variable resistor 40, and a fixed resistor 42. The conductivity of photosensitive cell 38 is directly related to the intensity of the light to which it is exposed. Photosensitive cell 38 is connected to DC power supply 12 through variable resistor 40. Photosensitive cell 38 is connected to debounce circuit 14 through resistor 42. When the ambient light to which photosensitive cell 38 is exposed is bright, current will flow through variable resistor 40 and phosensitive cell 38 to ground. As the ambient light decreases in intensity, the current flowing through the photosensitive cell will decrease, and the current flowing through resistor 42 will increase.

Debounce circuit 14 comprises capacitors 44 and 54, resistors 46, 52 and 58, diodes 50 and 56 and a Zener diode 48. Current flowing through resistor 42 flows into debounce circuit 14 to charge capacitor 44. Resistor 46 is connected across capacitor 44 to constantly discharge the capacitor. Thus, capacitor 44 will not charge to a given voltage unless the current flowing through resistor 42 exceeds a predetermined value. This predetermined value can be set by changing variable resistor 40.

When capacitor 44 charges to a voltage which exceeds the Zener voltage of Zener diode 48, the Zener diode will conduct and current will flow through diode 50 and resistor 52 to charge capacitor 54. The rate at which capacitor 54 charges is determined by the values of resistor 52 and the capacitor. The voltage generated across capacitor 54 flows through diode 56 and resistor 58 into the base of a transistor 28. When capacitor 54 sufficiently charges, transistor 28 will turn on.

The emitter of transistor 28 is connected to ground. The collector of transistor 28 is connected to first timer relay 24. When transistor 28 turns on, a circuit is completed between first timer relay 24, DC power supply 12 and ground turning the timer relay on. After a predetermined length of time, timer relay 24 times out, closing a set of normally open contacts 27. DC power supply 12, contacts 27, a coil winding 17 of relay 16, and transistor 28 are all in series. When contacts 27 close, relay 16 is turned on provided that transistor 28 is still on.

A set of normally closed contacts 21 of second timer relay 20, a set of normally open contacts 18 of relay 16 and the primary winding of load transformer 26 are connected in series with the AC power source. When contacts 18 close, power is supplied to load transformer 26, turning illumination lamps B on.

Also connected in series is DC power supply 12, contacts 27, second timer relay 20 and transistor 28. When contacts 27 close, second timer relay 20 also turns on. After a predetermined length of time, second timer relay 20 times out, opening normally closed contacts 21. Power to load transformer 26 will be interrupted, and illuminating lamps B will shut off.

Lamps B will also shut off if the ambient light increases in intensity above the predetermined level, for less current will flow through resistor 42 causing capacitor 44 to discharge below the Zener voltage of Zener diode 48. Current will no longer be supplied to charge capacitor 54, and the capacitor will slowly discharge through transistor 28. Transistor 28 will turn off, causing relay 18 to turn off. Contacts 18 will open, interrupting power to load transformer 26. Thus, the illuminating lamps will remain on either until second timer relay 20, times out or until the ambient light level increase above the predetermined level, whichever occurs first.

A manually operated switch 30 is provided to bypass the automatic control system to enable an operator to turn the illumination lamps on at will.

Figure 4:
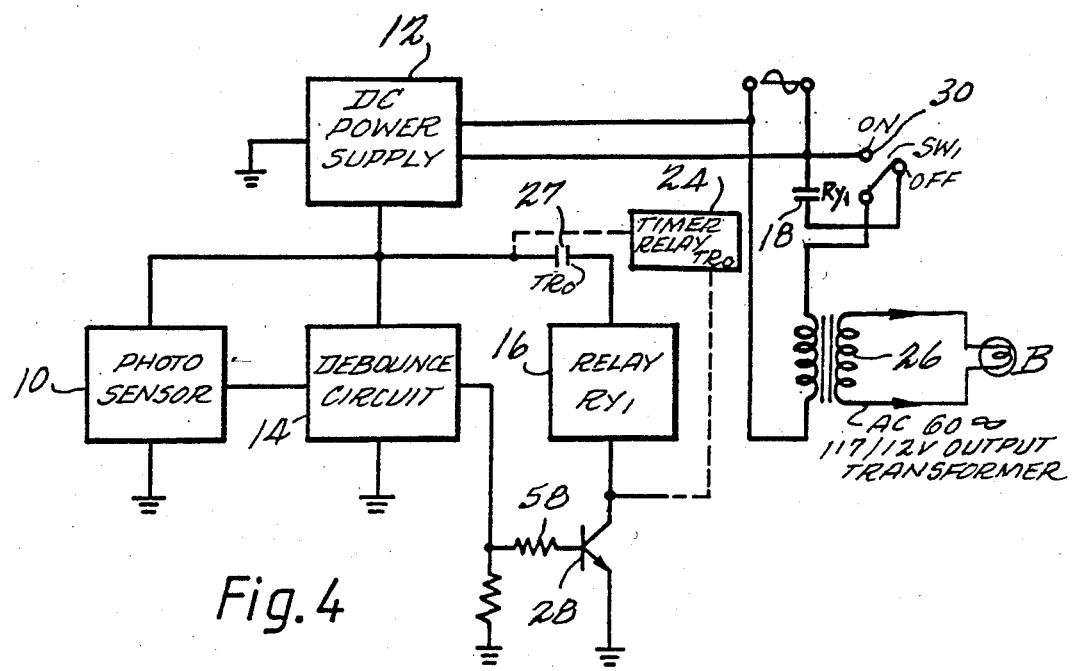
FIG. 4 is a block diagram of a second exemplary embodiment of the present invention.
Figure 5:
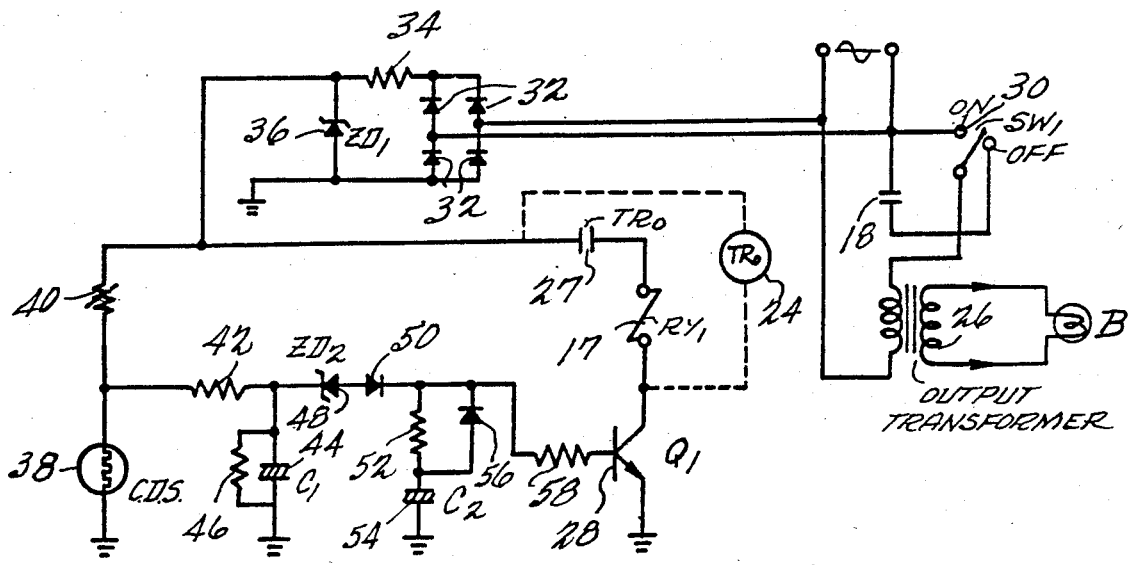
FIG. 5 is a schematic diagram of a second exemplary embodiment of the present invention.

Referring to FIGS. 4 and 5, a second exemplary embodiment of the present invention omits second timer relay 20. Illuminating lamps B will turn on when first timer relay 24 times out a predetermined time after the ambient light level to which photosensitive cell 38 is exposed falls below a predetermined level. The lamps will remain on until the ambient light increases above the predetermined level to turn transistor 28 off.

Figure 6:
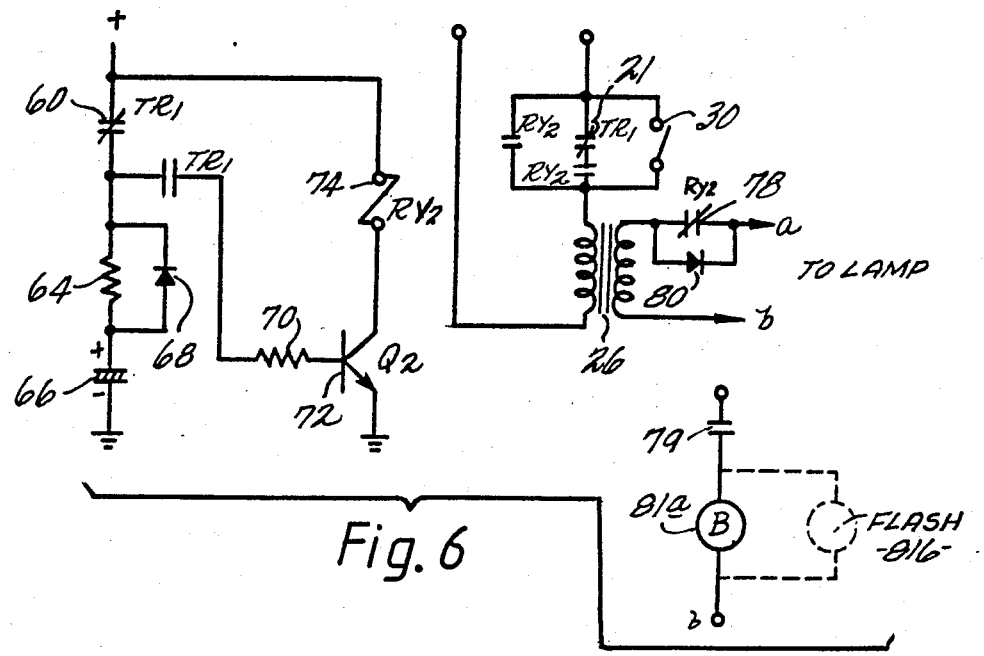
FIG. 6 is a schematic diagram of an exemplary embodiment of a dimmer circuit of an exemplary embodiment of the present invention.

Referring to FIG. 6, a circuit to give a visible warning signal before illuminating lamps B are shut off is shown. Another set of normally closed contacts 60 of second timing relay 20 is connected in series with DC power supply 12, a resistor 64, a capacitor 66 and ground. Because contacts 60 are normally closed, capacitor 66 is normally charged. The charge across capacitor 66 flows through a diode 68 to a set of normally open contacts 62 of second timer relay 20; the other side of contacts 62 is connected through a resistor 70 into the base of a transistor 72. Because contacts 62 are normally open, transistor 72 is normally off.

Referring to FIGS. 3 and 6, when timer relay 20 times out a predetermined length of time after transistor 28 turns on, contacts 21 open to turn off illuminating lamps B, contacts 60 open, and contacts 62 close to connect charged capacitor 66 to the base of transistor 72, turning on the transistor.

When transistor 72 turns on, a circuit is completed between DC power supply 12, a relay coil winding 74 and ground. When relay coil winding 74 is energized, a set of normally open contacts 76 close to connect the AC power source to the primary winding of load transformer 26. Power continues to be supplied to load transformer 26 even though contacts 21 of second timing relay 20 have opened. At the same time, a set of normally closed contacts 78 open to place a diode 80 in series with illuminating lamps B. Diode 80 rectifies the AC voltage applied to illuminating lamps B so that they receive only one-half of each AC cycle. Illuminating lamps B dim to half brightness. A period of time during which illuminating lamps B are dimmed allows people in the area of the illuminating lamps to depart before the lamps are completely turned off.

Capacitor 66 discharges through diode 68, resistor 70 and into the base of transistor 72. When capacitor 72 has almost completely discharged, transistor 72 turns off. Relay coil winding 74 is de-energized, contacts 76 open and illuminating lamps are completely turned off.

In addition to flashing illuminating lamps, a sound alarm device 81a may be connected across transformer 26 in series with a normally-open set of contacts 79. When relay coil 74 is energized by transistor 72, contacts 79 close and sound alarm device 81a emits a sound warning.

Figure 7:
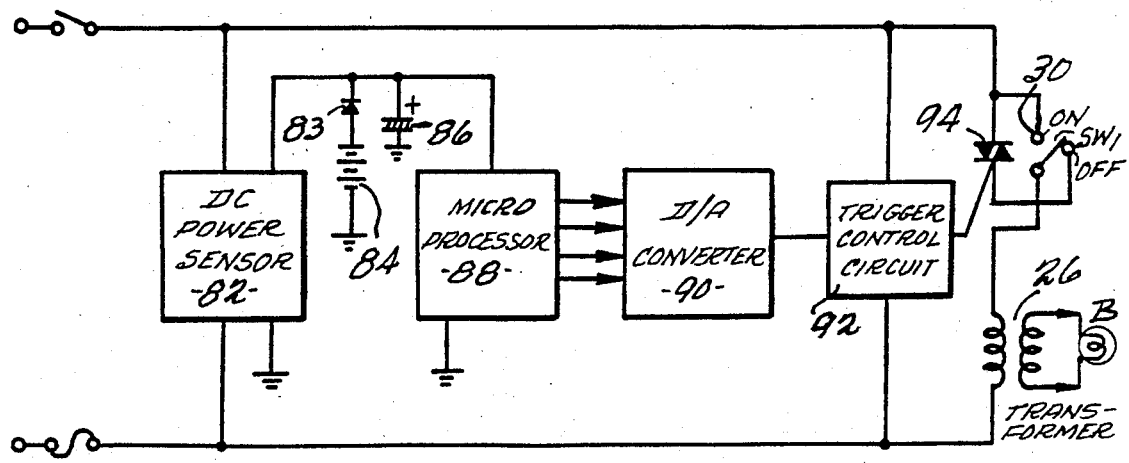
FIG. 7 is a block diagram of a third exemplary embodiment of the present invention.

Referring to FIG. 7, a third exemplary embodiment of the present invention using microprocessor control is shown. A DC power sensor 82 generates a DC voltage to charge a battery 84 through a diode 83. A microprocessor 88 is connected to battery 84 through diode 83. If the incoming AC power source is interrupted, microprocessor 88 may still operate from the voltage supplied by battery 84.

The output of microprocessor 88 is connected to a digital-to-analog (D/A) converter 90. The output of D/A converter 90 is connected to a trigger control circuit 92. The output of trigger control circuit 92 is connected to the gate of a Triac 94. Triac 94 is connected in series with the primary winding of load transformer 26. As microprocessor 88 generates a digital output, D/A converter 90 converts the digital output into a control signal. This control signal is applied to trigger control circuit 92 to activate Triac 94. The duty cycle of Triac 94 is determined by the control signal generated by D/A converter 90. Thus, microprocessor 88 can control not merely whether illuminating lamps B are on or off, but may also continuously vary their brightness.

Figure 8:
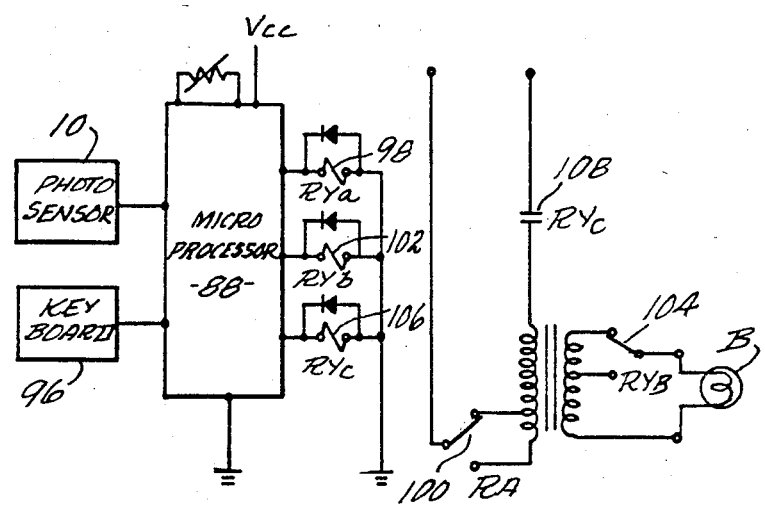
FIG. 8 is a schematic diagram of a third exemplary embodiment of the present invention.

Referring to FIG. 8, the third preferred exemplary embodiment of the present invention is shown with a circuit to vary the intensity of illuminating lamps B. Microprocessor 88 drives a relay coil 98, a relay coil 102 and a relay coil 106. A set of SPDT contacts 100 actuated by relay coil 98 can connect either part or all of the primary winding of load transformer 26 to the AC power source. A set of SPDT contacts 104 actuated by relay coil 102 can connect either all or part of the secondary winding of load transformer 26 to illuminating lamps B. A set of normally open contacts 108 actuated by relay coil 106 connect the primary winding of load transformer 26 to the AC power supply.

To activate illuminating lamps B, microprocessor 88 energizes on relay coil 106. Microprocessor 88 then may select one of four levels for the brightness of illuminating lamps B to one of four levels. If relay coil 98 and relay coil 102 are deenergized, illuminating lamps B will be very dim. If either relay coil 98 or relay coil 102 (but not both) are energized, the illuminating lamps will be brighter. The taps on the primary winding and the secondary winding of load transformer 26 may be selected so that relay coil 98 and relay coil 102 individually have different effects on the brightness of illuminating lamps B. When relay coil 98 and relay coil 102 are both on, illuminating lamps B will be at their brightest.

An operator may program and issue commands to microprocessor 88 through a keyboard 96. In addition, an input to microprocessor 88 is connected to photosensor 10. The output of photosensor 10 is at the logic level if the ambient light is greater than a predetermined level.

Figure 9:
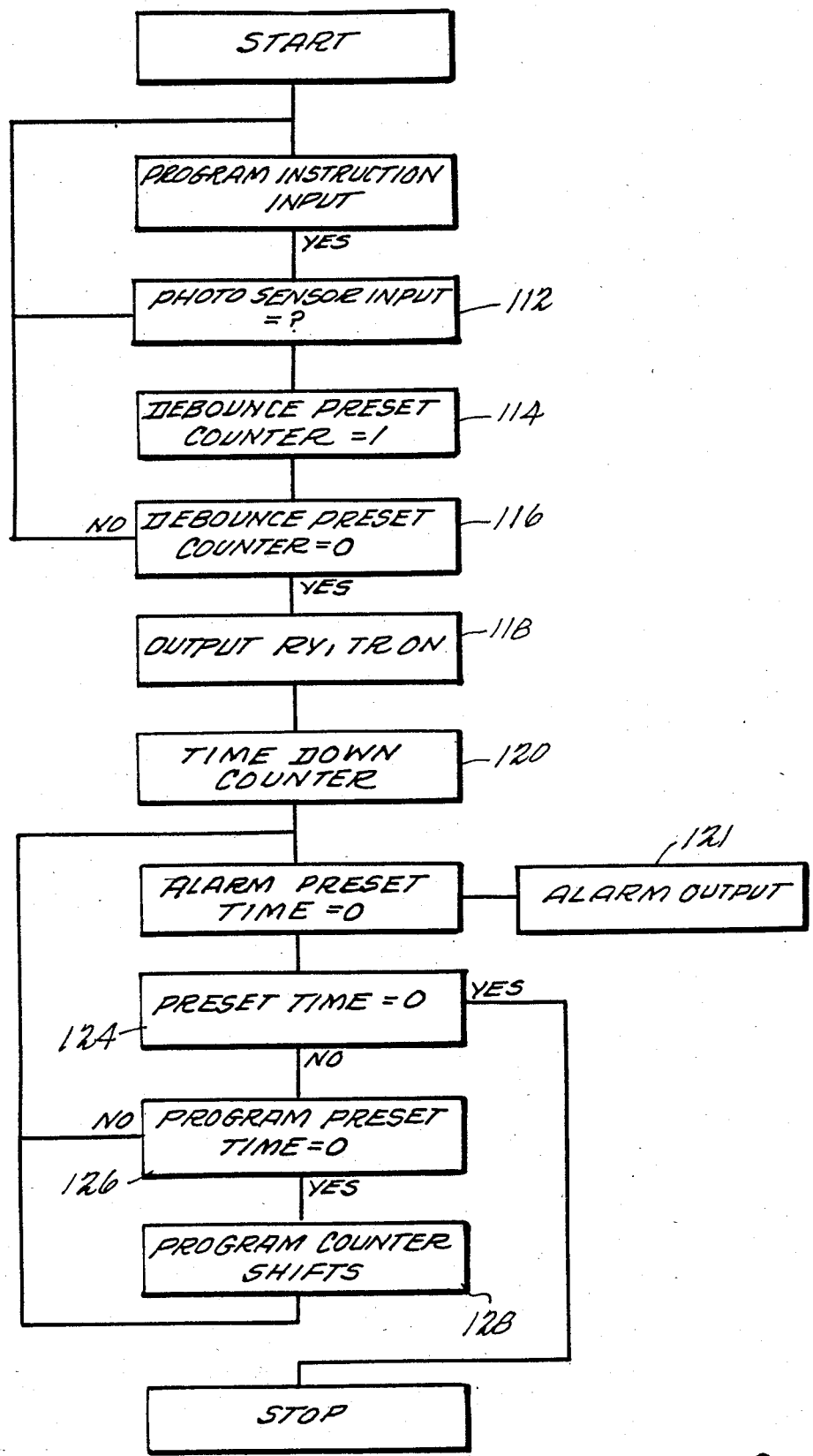
FIG. 9 is a flow chart of a program implemented by the third exemplary embodiment of the present invention.
Figure 10:
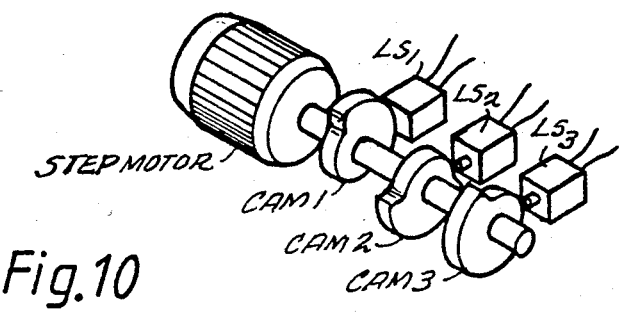
FIG. 10 is a side view of a fourth exemplary embodiment of the present invention.
Figure 11:
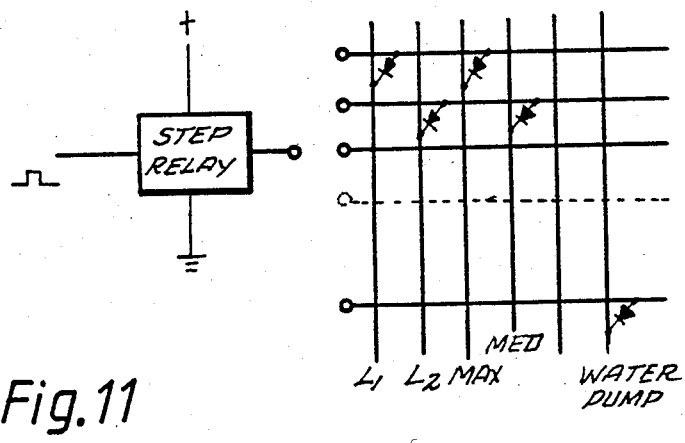
FIG. 11 is to exemplify the step program output by use of a point-to-point distribution formula.

Referring to FIG. 9, shown is the software executed by Microprocessor 88. Microprocessor 88 polls photosensor 10 in block 112. If photosensor 10 generates a high logic output, debounce preset counter is set in box 114. Thus the debounce preset counter is set wherever it is light outside. In block 116, debounce preset counter is tested. If the debounce preset counter is equal to one, program control loops back to poll photosensor 10 once again. However, if debounce preset counter is not set (indicating that the ambient light conditions to which photosensor 10 is exposed has dropped below a predetermined value, the microprocessor turns on an output relay to activate the illuminating lamps in block 118.

Microprocessor 88 then executes a timing routine in block 120 which controls the duration which the illuminating lamps remain on. Once microprocessor 88 reaches the end of this timing routine, it begins executing the alarm routine. Microprocessor 88 checks an alarm preset time counter 122, which is initialized before the routine is executed. Whenever this variable is not equal to "0", an alarm signal is generated in block 121.

If the alarm preset time counter is equal to "0", decision block 124 terminates execution of the routine. Otherwise, the alarm preset time counter is decremented in block 128 and program control loops back to check the value of alarm preset time once again. Thus, an alarm output is generated until the alarm preset counter is documented to "0".

Referring to FIGS. 12 and 13, embodiments of backup power supplies in accordance with the present invention are shown. Referring to FIGS. 13, 14 and 15, exemplary embodiments of the present invention employing parallel battery operated power supplies are shown. If the main power is interrupted, these alternate backup or parallel battery supplies will continue to supply power to the control sections of the apparatus to preserve timing and programming information.

Figure 17:
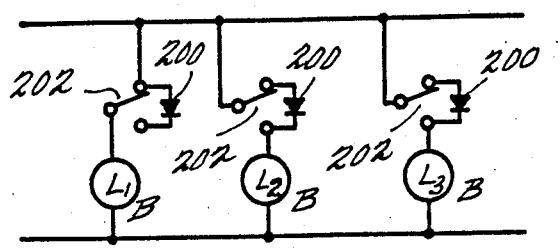
FIG. 17 is a schematic diagram of a first embodiment of a circuit to independently control the brightness of a plurality of lamps in accordance with the present invention.
Figure 18:
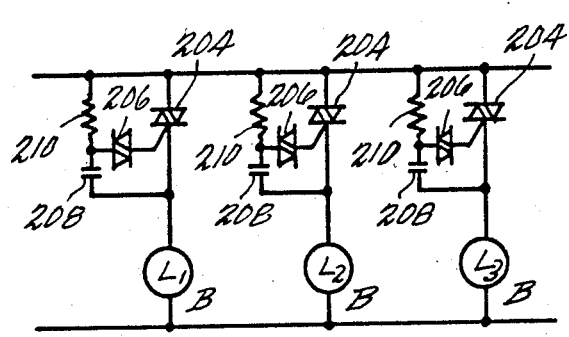
FIG. 18 is a schematic diagram of a second embodiment of a circuit to independently control the brightness of a plurality of lamps in accordance with the present invention.
Figure 19:
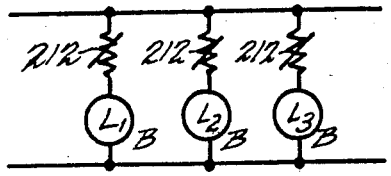
FIG. 19 is a schematic diagram of a third embodiment of a circuit to independently control the brightness of a plurality of lamps in accordance with the present invention.

Referring to FIGS. 17, 18 and 19, circuits in accordance with an exemplary embodiment of the present invention are shown to independently vary the intensity of illuminating lamps B.

Referring to FIG. 17, a diode 200 is placed in series with each illuminating lamp B. Diode 200 is or bypassed by the operation of SPDT contacts 202. Each illuminating lamp may thus be independently controlled for full or half brightness.

Referring to FIG. 18, each illuminating lamp is placed in series with a Triac 204. The gate of Triac 204 is connected to the junction of resistor 210 and a capacitor 208 through a Diac 206. The other terminal of resistor 210 is connected to one leg of the AC power source and the other terminal of capacitor 208 is connected to illuminating lamp B. The duty cycle of Triac 204 is controlled by the value of resistor 210. Each of the illuminating lamps may be fixed to a different intensity by varying resistor 210.

Referring to FIG. 19, a variable resistor 212 is placed in series with each illuminating lamp. Each variable resistors 212 may be independently varied to change the intensity of its corresponding illuminating lamp B.

Referring to FIGS. 20–23, shown are various circuits in accordance with the present invention to affect the brightness of all illuminating lamps B at once.

Figure 20:
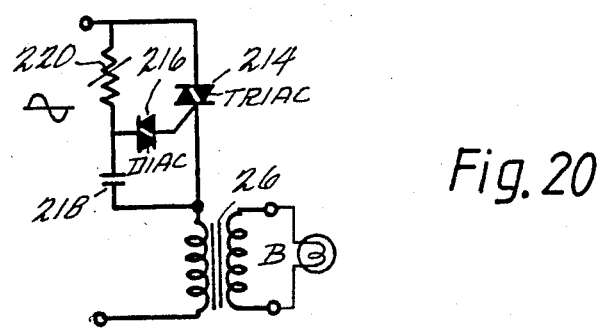
FIG. 20 is a schematic diagram of a fourth embodiment of a circuit to independently control the brightness of a plurality of lamps in accordance with the present invention.

Referring to FIG. 20, a Triac 214 is placed in series with the primary winding of load transformer 26 and the AC power source. The gate of Triac 214 is connected to the junction of a variable resistor 220 and a capacitor 218 through a Diac 216. The duty cycle of Triac 214 is determined by the value of variable resistor 220. The illuminating lamps B are connected to the secondary winding of load transformer 26. By varying the value of variable resistor 220, the brightness of illuminating lamps B is varied.

Figure 21:
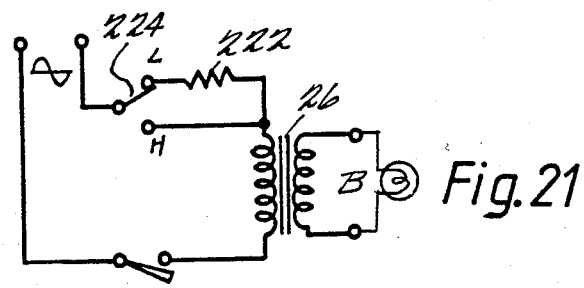
FIG. 21 is a schematic diagram of a fifth embodiment of a circuit to independently control the brightness of a plurality of lamps in accordance with the present invention.

Referring to FIG. 21, a fixed resistor 222 is selectively connected in series with the primary winding of load transformer 26 by operation of SPDT contacts 224. When fixed resistor 222 is connected in series with the primary winding, illuminating lamps B connected to the secondary of load transformers 26 will be dim.

Figure 22:
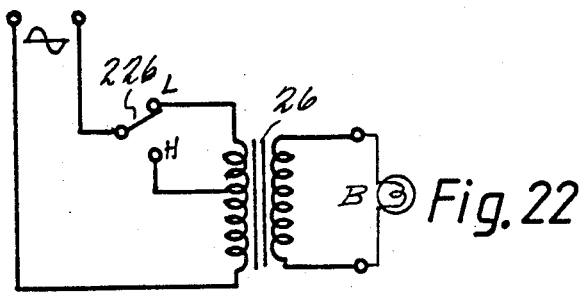
FIG. 22 is a schematic diagram of a sixth embodiment of a circuit to independently control the brightness of a plurality of lamps in accordance with the present invention.
Figure 23:
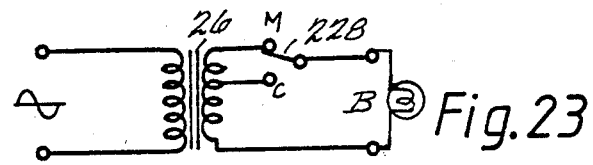
FIG. 23 is a schematic diagram of a seventh embodiment of a circuit to independently control the brightness of a plurality of lamps in accordance the present invention.

Referring to FIG. 22, a set of SPDT contacts 226 are connect either the entire primary winding or only part of the primary winding of load transformer 26 to the AC power source. When the entire primary winding of load transformer 26 is connected to the AC power source, illuminating lamps B connected on the secondary of load transformer 26 will light at full brightness. When only part of the primary winding is connected, illuminating lamps B are dim. Referring to FIG. 23, a similar result is reached by selectively connecting all or only part of the secondary winding of load transformer 26 to illuminating lamps B by operating a set of SPDT contacts 228.

Figure 24:
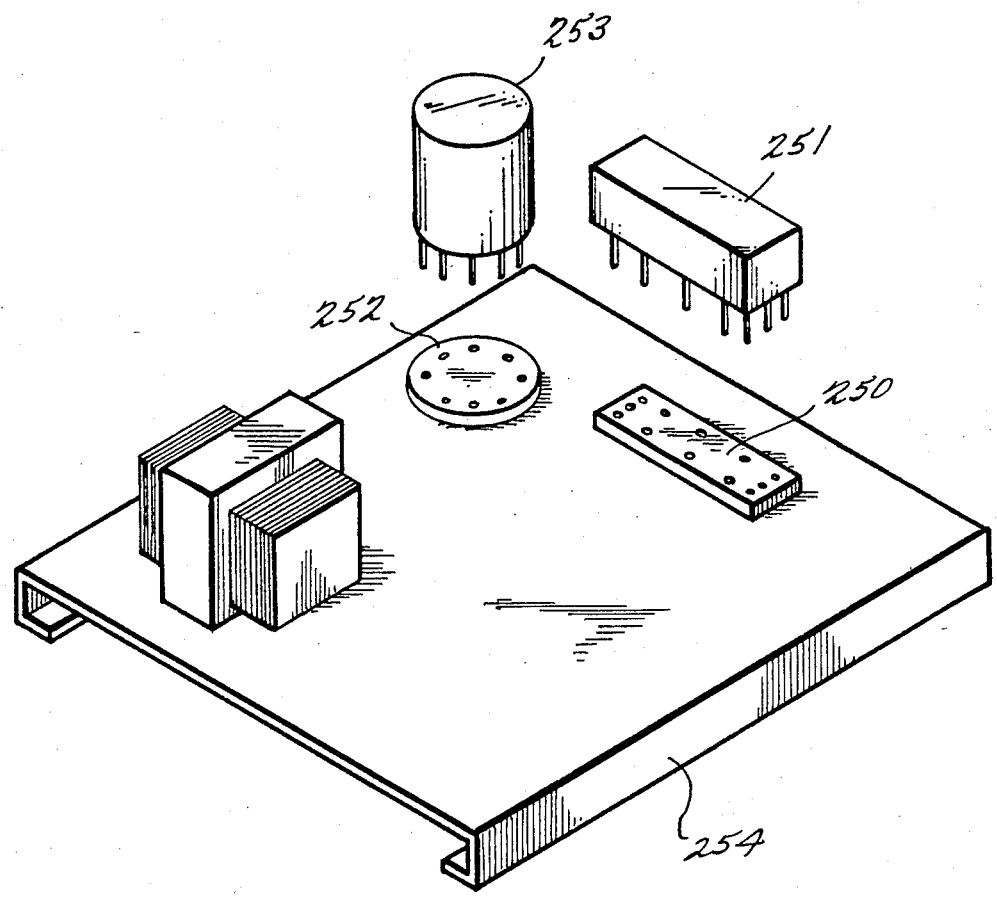
FIG. 24 is an exploded view of an exemplary embodiment of the present invention using modular construction.

Referring to FIG. 24, an exemplary embodiment in accordance with the present invention uses modular construction techniques. The various components of the present invention are housed in modular plug-in units 251 and 253. These modules mate with corresponding sockets 250 and 252 on a main frame 254. Assembly and service of the apparatus is simplified by modular construction.

Figure 25:
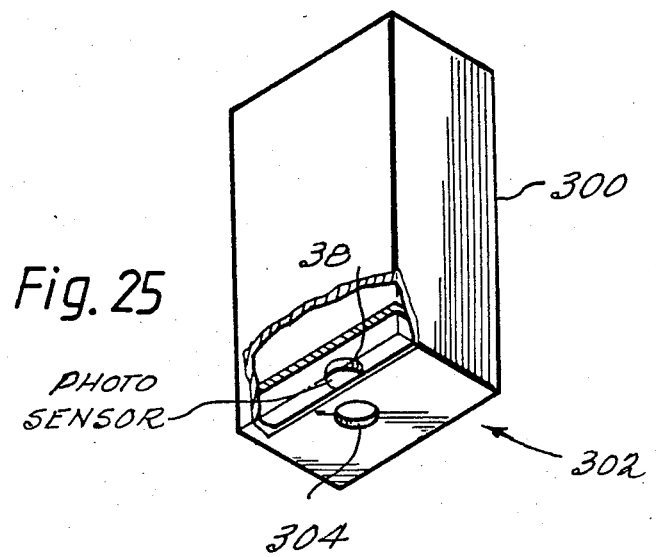
FIG. 25 is a cutaway view of an exemplary embodiment of the present invention incorporating a photosensor integral to the case of the apparatus.

Referring to FIG. 25, an embodiment of the present invention in which photosensitive cell 38 is an integral part of the apparatus 302 is shown. A hole 304 is disposed in a casing 300 of apparatus 302 to allow ambient light to strike photosensitive 38.

Figure 26:
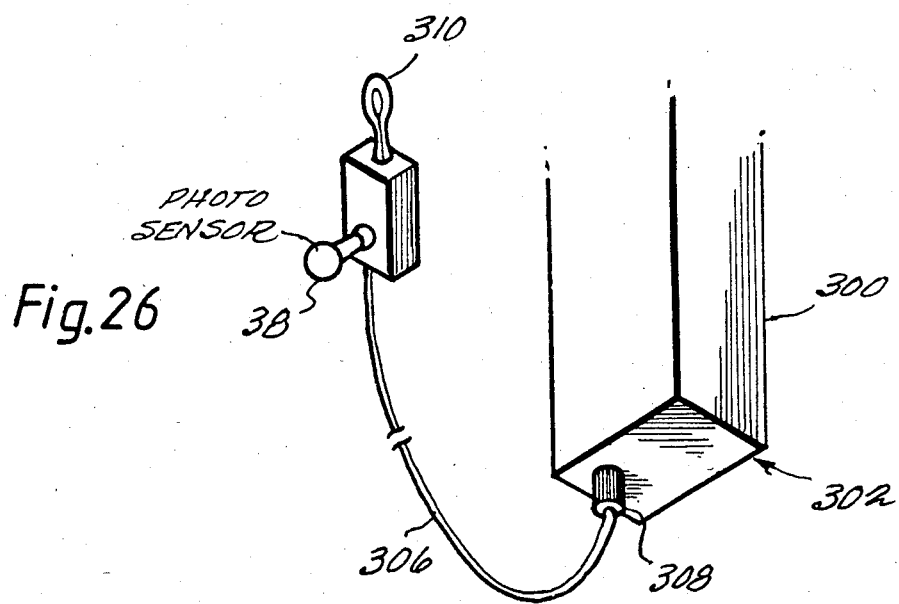
FIG. 26 is an exemplary embodiment of the present invention incorporating a photosensor which is not integral to the case of the apparatus.

Referring to FIG. 26, an embodiment photosensitive cell 38 is mounted away from casing 300 of apparatus 302. Photosensitive cell 38 is mounted on an adjustable bracket 310 in order to allow the photosensitive cell to be selectively positioned for optimum sensitivity to ambient light. Photosensitive cell 38 is connected to apparatus 300 by wires 306 and a plug 308.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modification and equivalent structures.

I claim:

1. An apparatus for controlling at least on illuminating lamp comprising:
   illuminating lamp means for producing illumination in response to a signal applied thereto;
   light sensing means for generating a first output signal when the illumination produced by a light source has fallen below a predetermined level;
   storage means for storing said first output signal;
   first timing means for generating a second output signal a first predetermined time after said storage means stores said first output signal;
   switching means for supplying a signal to said illuminating lamp means beginning when said second output signal is generated by said first timing means so long as said first output signal is also present; and
   second timing means for removing said signal from said illuminating lamp means after a second predetermined period of time has elapsed since said first timing means first generates said second output signal.

2. An apparatus as in claim 1 further comprising warning means for issuing a warning prior to removing said signal from said illuminating lamp means.

3. An apparatus as in claim 2 wherein said warning means includes means for producing an audible sound.

4. An apparatus as in claim 2 wherein said warning means includes means for varying the intensity of the illumination produced by said illuminating lamp means.

5. An apparatus as in claim 4 wherein said intensity-varying means includes means for alternating said illumination produced by said illuminating lamp means between two different intensity levels.

6. An apparatus as in claim 5 wherein said level-alternating means includes:
   means for alternating between first and second states;
   memory means for controlling the duration of said alternation of said alternating means; and
   means for changing the amplitide of said signal applied to said illuminating lamp means in response to said alterations in state.

7. An apparatus as in claim 1 wherein said storage means, first timing means and second timing means are implemented by a programmable microprocessor.

8. An apparatus as in claim 1 wherein said apparatus further includes:
   power supply means, coupled to an external alternating current power source, for providing power to said sensing means, storage means, first and second timing means and switching means; and
   backup power means for providing power to said sensing means, storage means, first and second timing means and switching means whenever said alternating current power source ceases to produce power.

9. An apparatus as in claim 1 wherein:
   said illuminating lamp means includes a plurality of illuminating lamps; and
   said apparatus further comprises brightness means for independently controlling the brightness of illumination of each of said plural illuminating lamps.

10. An apparatus as in claim 9 wherein said storage means, first timing means, second timing means, and brightness means are implemented by a programmable microprocessor.

11. An apparatus as in claim 1 wherein said light sensing means comprises a CDS photosensitive cell.

12. An apparatus as in claim 1 wherein said storage means comprises:
   a first resistor connected at a first terminal thereof to said first output signal;
   a first network having a predetermined amount of capacitance and a predetermined amount of resistance connected between a second terminal of said first resistor and a ground terminal;
   a Zener diode the cathode of which is connected to said first resistor second terminal;
   a first diode connected in series with said Zener diode, the anode of said first diode being connected to the anode of said Zener diode;
   a second resistor connected to the cathode of said first diode;
   solid state control means, operatively connected to said first timing means, for actuating said first timing means to begin timing said first predetermined time in response to current flowing through said second resistor; and
   a second network connected between the cathode of said first diode and said ground terminal, comprising:
      a capacitor one terminal of which is connected to said ground terminal,
      a third resistor connected between said first diode cathode and another terminal of said capacitor, and
      a second diode connected in parallel with said third resistor, the anode of said second diode being connected to said capacitor another terminal, the cathode of said second diode being connected to the cathode of said first diode.

13. An apparatus as in claim 1 wherein said switching means includes:
   a switching transistor having a control terminal and first and second switching terminals, the control terminal thereof connected to said second output signal; and
   a relay including a coil energized by said switching transistor control terminals, and further including a set of contacts which apply a current to said illuminating lamp means when said coil is energized.

14. An apparatus as in claim 1 wherein said first timing means includes a timing relay.

15. An apparatus as in claim 1 wherein said second timing means includes a timing relay.

16. An apparatus for controlling an illuminating lamp comprising:
   light sensing means for sensing the ambient light level produced by a light source;

means for producing a first signal when the ambient light level sensed by said sensing means falls below a predetermined level;

means for timing a first predetermined period of time beginning when said first signal-producing means first produces said first signal;

means for producing a second signal when said first predetermined period of time timed by said timing means has elapsed so long as said first signal-producing means is still producing said first signal; and means for supplying power to at least one illuminating lamp in response to said second signal.

17. An apparatus as in claim 16 further including another timing means for controlling said power supplying means to remove the power supplied to said illuminating lamp after a second predetermined period of time has elapsed since said second signal producing means first produced said second signal.

18. A method for controlling an illuminating lamp comprising the steps:

(1) sensing the ambient light level produced by a light source;

(2) producing a first signal when the ambient light level sensed by said sensing step (1) falls below a predetermined level;

(3) timing a first predetermined period of time beginning when said producing step (2) first produces said first signal;

(4) producing a second signal when said first predetermined period of time timed by said timing step (3) has elapsed so long as said producing step (2) is still producing said first signal; and (5) supplying power to at least one illuminating lamp in response to said second signal.

19. A method as in claim 18 further including the step of removing the power applied to said illuminating lamp by said supplying step (5) after a second predetermined period of time has elapsed since said producing step (4) first produces said second signal.

* * * * *